(12) United States Patent
Chen et al.

(10) Patent No.: US 11,368,115 B2
(45) Date of Patent: Jun. 21, 2022

(54) VEHICLE DRIVING DEVICE AND METHOD THEREOF

(71) Applicant: Universal Scientific Industrial (Shanghai) Co., Ltd., Shanghai (CN)

(72) Inventors: Chih-Huang Chen, Shanghai (CN); Su-Hui Wang, Shanghai (CN); Chih-Hung Huang, Shanghai (CN); Lee-Han Lin, Shanghai (CN); Chien-Lin Liu, Shanghai (CN)

(73) Assignee: Universal Scientific Industrial (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 17/128,176

(22) Filed: Dec. 20, 2020

(65) Prior Publication Data

US 2022/0103103 A1 Mar. 31, 2022

(30) Foreign Application Priority Data

Sep. 30, 2020 (CN) .......................... 202011054109.5

(51) Int. Cl.
*H02H 7/122* (2006.01)
*H02P 21/06* (2016.01)
*H02P 21/22* (2016.01)
*G05B 11/42* (2006.01)

(52) U.S. Cl.
CPC .............. *H02P 21/06* (2013.01); *G05B 11/42* (2013.01); *H02P 21/22* (2016.02); *H02P 2207/05* (2013.01)

(58) Field of Classification Search
CPC .. H02P 6/28; H02P 21/06; H02P 21/22; H02P 2207/05; G05B 11/42; H02H 7/1227
See application file for complete search history.

(56) References Cited

U.S. PATENT DOCUMENTS

| 2018/0175779 A1* | 6/2018 | Koseki ................. H02H 7/1227 |
| 2019/0149072 A1* | 5/2019 | Suzuki ..................... H02P 6/28 |
| | | 318/139 |

FOREIGN PATENT DOCUMENTS

| CN | 103001578 B | 5/2015 |
| CN | 109318722 A | 2/2019 |
| JP | H08280192 A | 10/1996 |

* cited by examiner

*Primary Examiner* — Cortez M Cook
(74) *Attorney, Agent, or Firm* — CKC & Partners Co., LLC (57) ABSTRACT

A vehicle driving device is driven by a power unit. A three-phase motor includes a first stator winding and a second stator winding. The first stator winding is connected in parallel to the second stator winding, and the first stator winding and the second stator winding are synchronized with each other. A first current sensor is coupled to the first stator winding for measuring a first-phase current. A second current sensor is coupled to the first stator winding for measuring a second-phase current. A third-phase current of the first stator winding is generated according to a calculating procedure of the first-phase current and the second-phase current. A duty cycle between a first power module and a second power module is controlled according to a feedback compensation of the first-phase current, the second-phase current and the third-phase current.

5 Claims, 7 Drawing Sheets

VEHICLE DRIVING DEVICE AND METHOD THEREOF

RELATED APPLICATIONS

This application claims priority to China Application Serial Number 202011054109.5, filed Sep. 30, 2020, which is herein incorporated by reference.

BACKGROUND

Technical Field

The present disclosure relates to a vehicle driving device and a vehicle driving method. More particularly, the present disclosure relates to a vehicle driving device and a vehicle driving method of a hybrid electric vehicle.

Description of Related Art

The general field-oriented control (FOC) theory mainly controls the magnitude of the three-phase current according to the position of the motor rotor and the phase of the corresponding stator magnetic field. In recent years, the power transistors (MOSFET or IGBT) are used as the switches and adjust the duty cycle of the switches so as to control the magnitude of the three-phase current. Each of the phases has a current sensor, and the current sensor makes the controlling current compensate the feedback. The most typical feedback compensation control theory is a proportional-integral-derivative (PID) controller. In the conventional art, two of the three phases are measured and the other phase is calculated. After the total current of each of the phases and the phases are finally obtained, the duty cycle for turning on and off the three-phase power transistor is controlled according to the current phasor, the coordinate conversion and the feedback compensation so as to stably control the output power of the motor, so that the driving mode and the power generating mode of the motor are regulated.

However, when the output power of the motor is too large, the current that needs to be controlled also increases, and the harmonics related to the current are also increasing at the same time. Therefore, the harmonics affect the stability of the measurement about the feedback current and cause the output power of the motor to be unable to increase, and the efficiency of the motor is decreased. The motor control of the inverter of the 48V hybrid electric vehicle is mainly based on the FOC theory, but the FOC theory must be established under the certain assumptions. As a result, the assumptions and the problem of controlling the accuracy of the feedback signal must be considered in the operation. In view of the problems in the above FOC theory, how to develop an accurate detecting device and a detecting method for the feedback signal which becomes the goal of the public and relevant industry efforts.

SUMMARY

According to an embodiment of an aspect of the present disclosure, a vehicle driving device driven by a power unit includes a three-phase motor, a first current sensor, a second current sensor, a first power module and a second power module. The three-phase motor includes a first stator winding and a second stator winding. The first stator winding is connected in parallel to the second stator winding. The first stator winding and the second stator winding are synchronized with each other, and each of the first stator winding and the second stator winding includes a first-phase winding end, a second-phase winding end and a third-phase winding end. The first current sensor has a first end and a second end. The first end of the first current sensor is coupled to the first-phase winding end of the first stator winding, and the first current sensor is configured to measure a first-phase current of the first stator winding. The second current sensor has a first end and a second end. The first end of the second current sensor is coupled to the second-phase winding end of the first stator winding, and the second current sensor is configured to measure a second-phase current of the first stator winding. The first power module is electrically connected to the power unit, the second end of the first current sensor, the second end of the second current sensor and the third-phase winding end of the first stator winding. The second power module is connected in parallel to the first power module and electrically connected to the power unit, and the first-phase winding end, the second-phase winding end and the third-phase winding end of the second stator winding. A third-phase current of the first stator winding is generated according to a calculating procedure of the first-phase current and the second-phase current of the first stator winding. A duty cycle between the first power module and the second power module is controlled according to a feedback compensation of the first-phase current, the second-phase current and the third-phase current of the first stator winding.

According to an embodiment of another aspect of the present disclosure, a vehicle driving method includes a paralleling step, a measuring step, a calculating step and a controlling step. The paralleling step is performed to connect the first stator winding and the second stator winding in parallel to form the three-phase motor. The first stator winding and the second stator winding are synchronized with each other, and each of the first stator winding and the second stator winding includes the first-phase winding end, the second-phase winding end and the third-phase winding end. The measuring step is performed to drive the first current sensor to measure the first-phase current of the first stator winding according to the first-phase winding end of the first stator winding, and drive the second current sensor to measure the second-phase current of the first stator winding according to the second-phase winding end of the first stator winding. The first current sensor is coupled to the first-phase winding end of the first stator winding, and the second current sensor is coupled to the second-phase winding end of the first stator winding. The calculating step is performed to calculate the first-phase current and the second-phase current of the first stator winding according to the calculating procedure to generate the third-phase current of the first stator winding. The controlling step is performed to drive the first power module and the second power module to control the duty cycle between the first power module and the second power module according to the feedback compensation of the first-phase current, the second-phase current and the third-phase current of the first stator winding.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
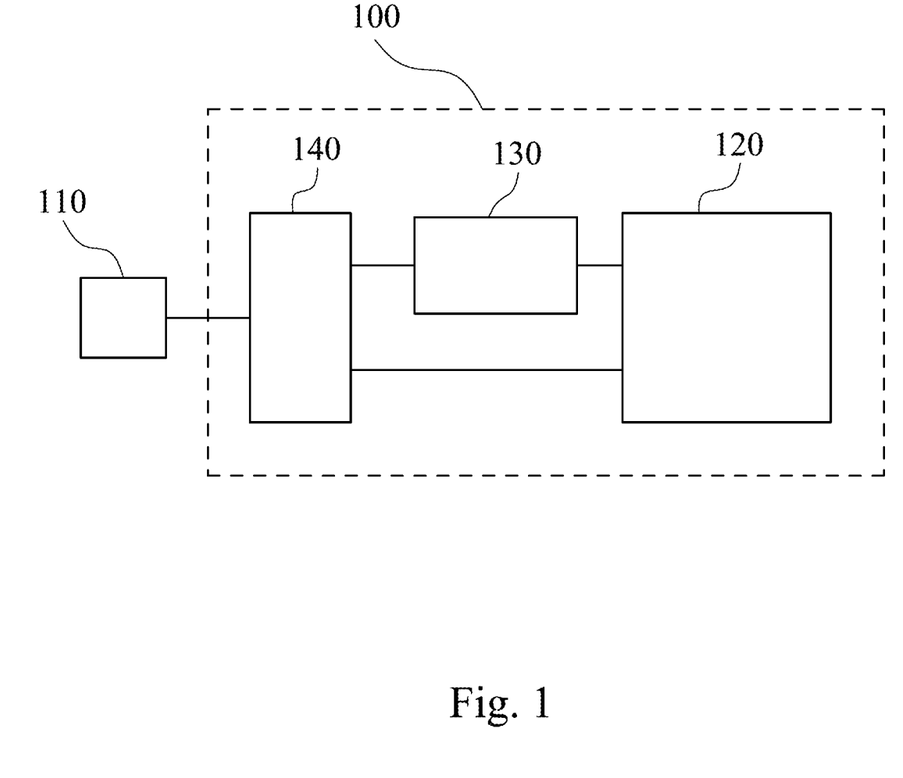
FIG. 1 shows a schematic view of a vehicle driving device according to an embodiment of a structural aspect of the present disclosure.
Figure 2:
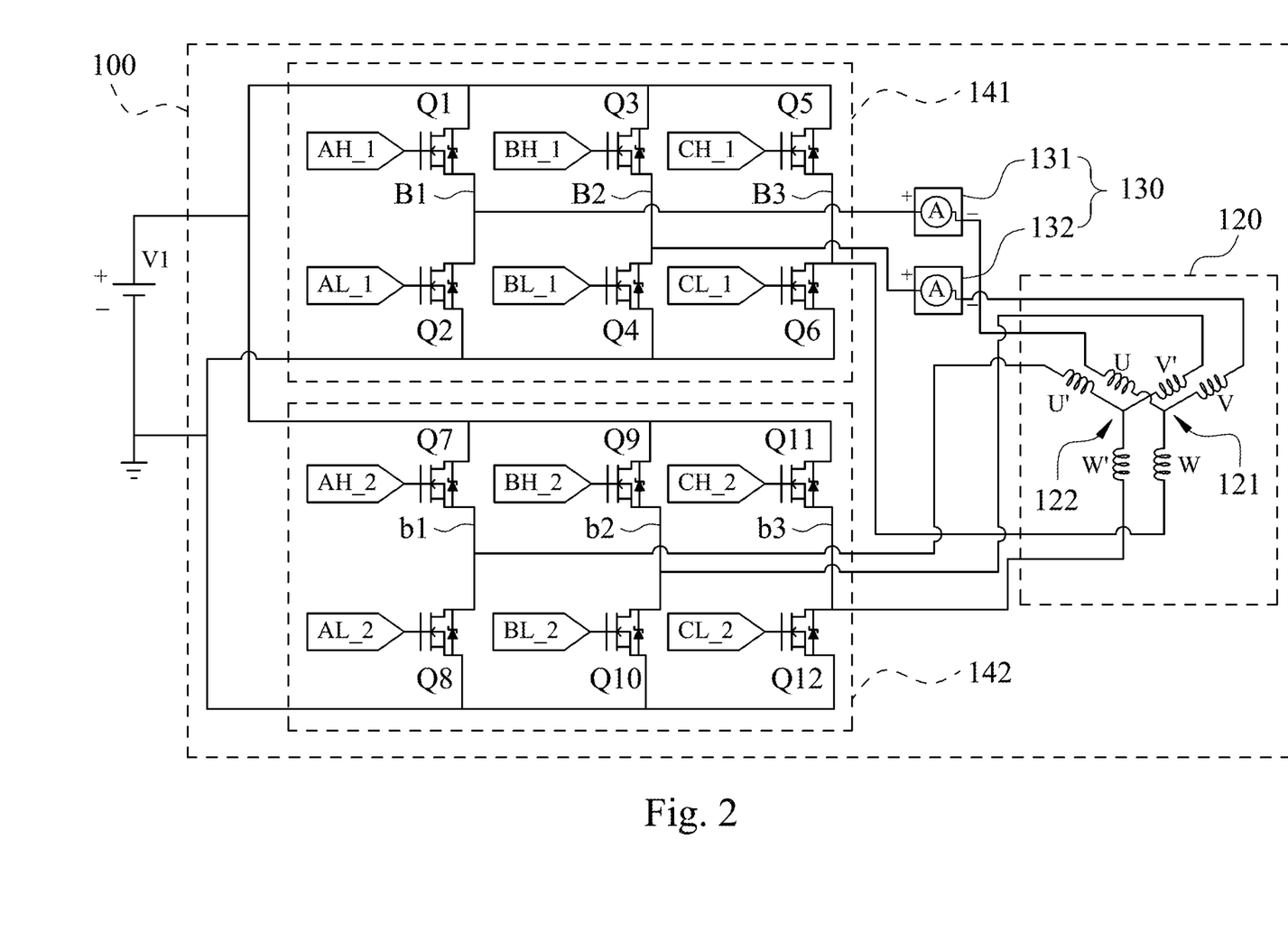
FIG. 2 shows a circuit diagram of the vehicle driving device and a power supply unit of FIG. 1.

Please refer to FIGS. 1 and 2. FIG. 1 shows a schematic view of a vehicle driving device 100 according to an embodiment of a structural aspect of the present disclosure. FIG. 2 shows a circuit diagram of the vehicle driving device 100 and a power supply unit 110 of FIG. 1. In FIG. 1, the vehicle driving device 100 is driven by the power supply unit 110 and includes a three-phase motor 120, a sensing unit 130 and a power unit 140. The three-phase motor 120 is electrically connected to the sensing unit 130 and the power unit 140. The sensing unit 130 is coupled between the three-phase motor 120 and the power unit 140. The power unit 140 operates the three-phase motor 120 according to a duty cycle (not shown). The circuit diagrams of the vehicle driving device 100 and the power supply unit 110 and the operating relationship of the internal components thereof will be described in detail below.

In FIG. 2, the power supply unit 110 can be a first power supply V1. The sensing unit 130 can include a first current sensor 131 and a second current sensor 132. The power unit 140 can include a first power module 141 and a second power module 142. The vehicle driving device 100 is powered by the first power supply V1. The three-phase motor 120 includes a first stator winding 121 and a second stator winding 122. The first stator winding 121 is connected in parallel to the second stator winding 122. The first stator winding 121 and the second stator winding 122 are synchronized with each other; in other words, the first stator winding 121 and the second stator winding 122 have no phase difference therebetween. The first stator winding 121 includes a first-phase winding end U, a second-phase winding end V and a third-phase winding end W. The second stator winding 122 includes a first-phase winding end U', a second-phase winding end V' and a third-phase winding end W'.

In specific, the first current sensor 131 has a first end and a second end. The first end of the first current sensor 131 is coupled to the first-phase winding end U of the first stator winding 121, and the first current sensor 131 is configured to measure a first-phase current 1211 of the first stator winding 121 (shown in FIG. 4). The second current sensor 132 has a first end and a second end. The first end of the second current sensor 132 is coupled to the second-phase winding end V of the first stator winding 121, and the second current sensor 132 is configured to measure a second-phase current 1212 of the first stator winding 121 (shown in FIG. 4). The first power module 141 is electrically connected to the first power supply V1, the second end of the first current sensor 131, the second end of the second current sensor 132 and the third-phase winding end W of the first stator winding 121. The second power module 142 is connected in parallel to the first power module 141 and electrically connected to the first power supply V1, and the first-phase winding end U', the second-phase winding end V' and the third-phase winding end W of the second stator winding 122. A third-phase current (not shown) of the first stator winding 121 is generated according to a calculating procedure of the first-phase current 1211 and the second-phase current 1212 of the first stator winding 121. The duty cycle between the first power module 141 and the second power module 142 is controlled according to a feedback compensation of the first-phase current 1211, the second-phase current 1212 and the third-phase current of the first stator winding 121.

Furthermore, the first power module 141 can include two first power elements Q1, Q2, two second power elements Q3, Q4 and two third power elements Q5, Q6. The first power elements Q1, Q2 are connected in series to form a first bridge arm B1. The first power elements Q1, Q2 have two controlling signals AH_1, AL_1, respectively. The first bridge arm B1 is electrically connected to the second end of the first current sensor 131. The second power elements Q3, Q4 are connected in series to form a second bridge arm B2. The second power elements Q3, Q4 have two controlling signals BH_1, BL_1, respectively. The second bridge arm B2 is electrically connected to the second end of the second current sensor 132. The third power elements Q5, Q6 are connected in series to form a third bridge arm B3. The third power elements Q5, Q6 have two controlling signals CH_1, CL_1, respectively. The third bridge arm B3 is electrically connected to the third-phase winding end W of the first stator winding 121.

Moreover, the second power module 142 can include two first power elements Q7, Q8, two second power elements Q9, Q10 and two third power elements Q11, Q12. The first power elements Q7, Q8 are connected in series to form a first bridge arm b1. The first power elements Q7, Q8 have two controlling signals AH_2, AL_2, respectively. The first bridge arm b1 is electrically connected to the first-phase winding end U' of the second stator winding 122. The second power elements Q9, Q10 are connected in series to form a second bridge arm b2. The second power elements Q9, Q10 have two controlling signals BH_2, BL_2, respectively. The second bridge arm b2 is electrically connected to the second-phase winding end V' of the second stator winding 122. The third power elements Q11, Q12 are connected in series to form a third bridge arm b3. The third power elements Q11, Q12 have two controlling signals CH_2, CL_2, respectively. The third bridge arm b3 is electrically connected to the third-phase winding end W of the second stator winding 122. Each of the power elements can be a Metal-Oxide-Semiconductor Field-Effect Transistor (MOSFET) or an Insulated Gate Bipolar Transistor (IGBT) as a switch, and each of the power elements can be driven by an isolated gate driver (not shown).

In detail, the calculating procedure which calculates the third-phase current is similar to a field-oriented control (FOC) theory, wherein the third-phase current is controlled by the feedback of the first-phase current 1211 and the second-phase current 1212. Since the three-phase radian is $2\pi$ (that is, 360°), the third-phase current is calculated through a microcontroller (or a microprocessor). The FOC theory is the conventional art, and will not be detailedly described herein. It is worth noting that, the first stator winding 121 and the second stator winding 122 can be Y-connected (Star) or Δ-connected (Delta) to each other, and the stator windings of the three-phase motor 120 can also be plural. The stator windings are connected in parallel in the winding groove of the motor. No matter how many sets of the stator windings are connected in parallel, the control of the three-phase motor 120 only needs to detect two phase currents of one set of the stator windings and perform the feedback compensation according to a scale between the first stator winding 121 and the second stator winding 122. The reference of the controlling current is not to measure all of the phase currents of the three-phase motor 120. Therefore, the harmonics related to the phase currents are reduced, and the hunting phenomenon caused by the oscillation of the feedback currents is reduced. The embodiment of the present disclosure includes two stator windings. The first-phase current 1211, the second-phase current 1212 and the third-phase current are multiplied by two times via the two stator windings to stably control the torque and the speed of the three-phase motor 120 or the power generation of the three-phase motor 120, but the present disclosure is not limited to the embodiment.

Figure 3:
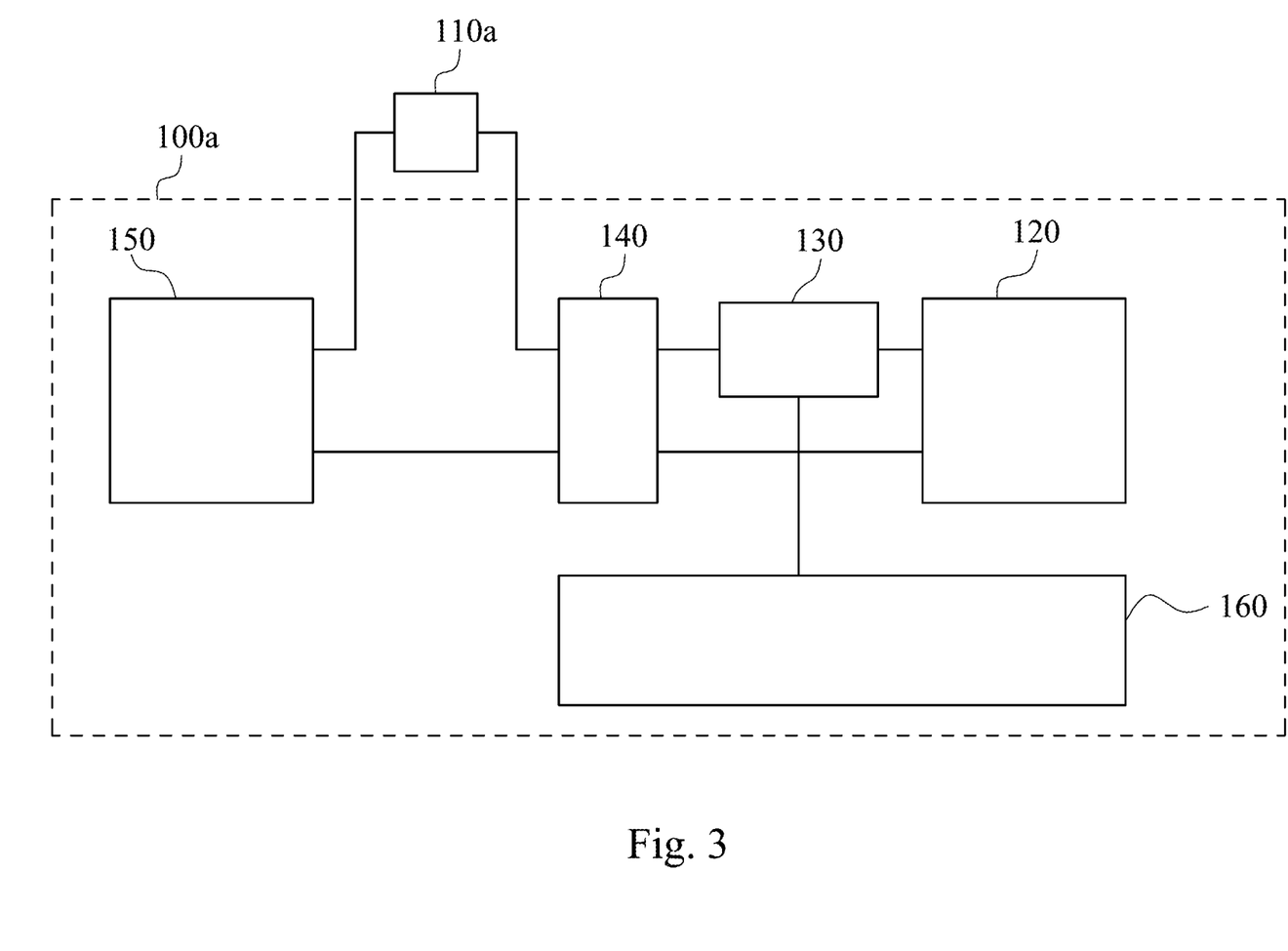
FIG. 3 shows a schematic view of a vehicle driving device according to another embodiment of the structural aspect of the present disclosure.
Figure 4:
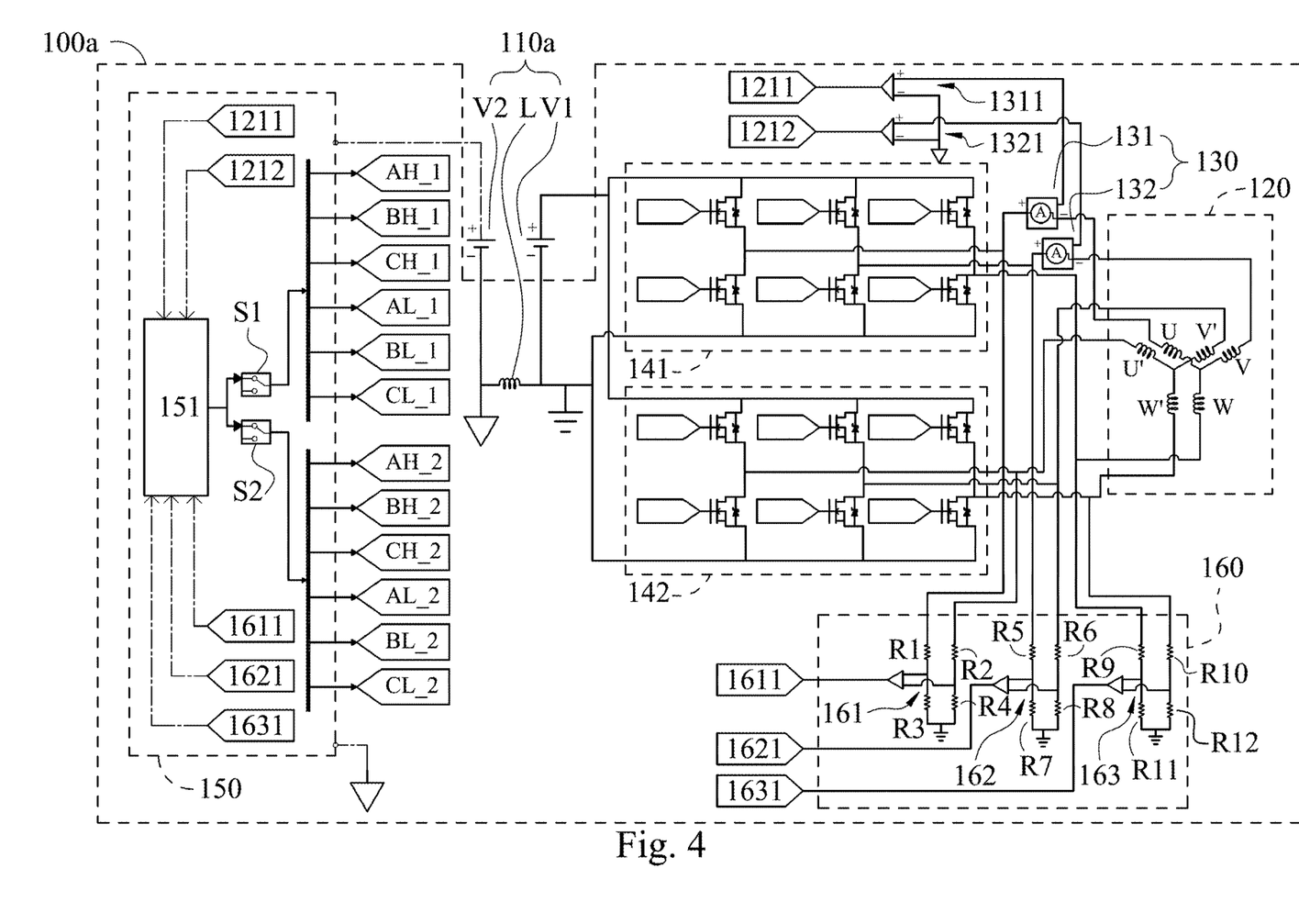
FIG. 4 shows a circuit diagram of the vehicle driving device and a power supply unit of FIG. 3.

Please refer to FIGS. 1 to 4. FIG. 3 shows a schematic view of a vehicle driving device 100a according to another embodiment of the structural aspect of the present disclosure. FIG. 4 shows a circuit diagram of the vehicle driving device 100a and a power supply unit 110a of FIG. 3. In the another embodiment of FIG. 3, the arrangement relationship between the three-phase motor 120, the sensing unit 130 and the power unit 140 of the vehicle driving device 100a is the same as the corresponding elements in the embodiment of FIG. 1. In the circuit diagram of FIG. 4, the elements inside the first power module 141 and the second power module 142 are the same as the corresponding elements in the circuit diagram of FIG. 2, and will not be detailedly described herein. In FIG. 3, the vehicle driving device 100a of the present disclosure can reduce the use of the expensive current sensors. However, the phase signals of the power element which do not have the current sensors cannot be monitored. The vehicle driving device 100a of the present disclosure can further include a controlling unit 150 and a detecting module 160 in order to achieve the safe motor control, wherein the vehicle driving device 100a is driven by the power supply unit 110a. The controlling unit 150 is electrically connected to the power supply unit 110a and the power unit 140. The power supply unit 110a is coupled between the controlling unit 150 and the power unit 140. The detecting module 160 is coupled to the three-phase motor 120, the sensing unit 130 and the power unit 140. The controlling unit 150 controls the duty cycle of the power unit 140 to operate the three-phase motor 120. The circuit diagram of the vehicle driving device 100a and the power supply unit 110a and the operating relationship of the internal components thereof will be described in detail below.

Specifically, in FIG. 4, the detecting module 160 is coupled to the first stator winding 121 and the second stator winding 122 and outputs a plurality of detecting signals (its reference numeral is omitted) according to the first stator winding 121 and the second stator winding 122, wherein the detecting signals are a first-phase voltage signal 1611, a second-phase voltage signal 1621 and a third-phase voltage signal 1631, respectively.

In addition, the detecting module 160 can include a first comparator 161, a second comparator 162 and a third comparator 163. The first comparator 161 is electrically connected to the first-phase winding end U of the first stator winding 121 and the first-phase winding end U' of the second stator winding 122. The second comparator 162 is electrically connected to the second-phase winding end V of the first stator winding 121 and the second-phase winding end V' of the second stator winding 122. The third comparator 163 is electrically connected to the third-phase winding end W of the first stator winding 121 and the third-phase winding end W' of the second stator winding 122. The first comparator 161 includes a plurality of resistors R1, R2, R3, R4. The second comparator 162 includes a plurality of resistors R5, R6, R7, R8. The third comparator 163 includes a plurality of resistors R9, R10, R11, R12. The resistors R1, R2, R3, R4, R5, R6, R7, R8, R9, R10, R11, R12 are configured to divide the phase voltages from the first stator winding 121 and the second stator winding 122.

Further, the first comparator 161 generates the first-phase voltage signal 1611 according to the first-phase winding end U of the first stator winding 121 and the first-phase winding end U' of the second stator winding 122. The second comparator 162 generates the second-phase voltage signal 1621 according to the second-phase winding end V of the first stator winding 121 and the second-phase winding end V' of the second stator winding 122. The third comparator 163 generates the third-phase voltage signal 1631 according to the third-phase winding end W of the first stator winding 121 and the third-phase winding end W of the second stator winding 122.

Furthermore, the power supply unit 110a can further include an inductor L, a first power supply V1 and a second power supply V2. The inductor L is disposed between the first power supply V1 and the second power supply V2, and electrically connected to the first power supply V1 and the second power supply V2. The first power supply V1 is electrically connected to the first power module 141 and the second power module 142. The controlling unit 150 is electrically connected to the second power supply V2 and includes a controller 151. The controller 151 receives the detecting signals and generates a detecting result according to the detecting signals (i.e., the first-phase voltage signal 1611, the second-phase voltage signal 1621 and the third-phase voltage signal 1631). Especially, the controlling unit 150 can further include a first switch S1 and a second switch S2. The first switch S1 is coupled to the first power module 141. The second switch S2 is coupled to the second power module 142. It is worth noting that, the vehicle driving device 100a can further include a first signal amplifier 1311 and a second signal amplifier 1321. The first signal amplifier 1311 is electrically connected to the first end of the first current sensor 131 for generating the first-phase current 1211 of the first stator winding 121. The second signal amplifier 1321 is electrically connected to the first end of the second current sensor 132 for generating the second-phase current 1212 of the first stator winding 121. The controller 151 receives the first-phase current 1211 and the second-phase current 1212, and generates a third-phase current according to a calculating procedure of the first-phase current 1211 and the second-phase current 1212 of the first stator winding 121. More notably, the controller 151 synchronizes the first power module 141 and the second power module 142 through the first switch S1 and the second switch S2; in other words, the first switch S1 and the second switch S2 are mainly configured to diagnose the power elements of the first power module 141 and the power elements of the second power module 142. The controller 151 is mainly configured to calculate the duty cycle through the FOC theory. When the duty cycle is controlled, the first power module 141 and the second power module 142 are driven to synchronize with each other through the first switch S1 and the second switch S2.

In detail, the controlling unit 150 and the detecting module 160 mainly use three sets of isolated operational amplifiers to measure the signals having the same phase in the first stator winding 121 and the second stator winding 122 (that is, the signals having the same phase in the first power module 141 and the second power module 142), and go with the controller 151 to synchronize the first power module 141 and the second power module 142 through the first switch S1 and the second switch S2 and independently detect the first power module 141 and the second power module 142. More detail, the controller 151 sets a range value according to each of the phases of the three-phase motor 120. For example, the first-phase winding end U of the first stator winding 121 and the first-phase winding end U' of the second stator winding 122 are set to a specific condition that the normal operating voltage range is 2 to 3V. After the controlling unit 150 receives the voltage signal of each of the phases of the three-phase motor 120 from the detecting module 160, the controlling unit 150 independently judges whether each of the phases of the three-phase motor 120 is normal according to the voltage range to generate the detecting result.

Figure 5:
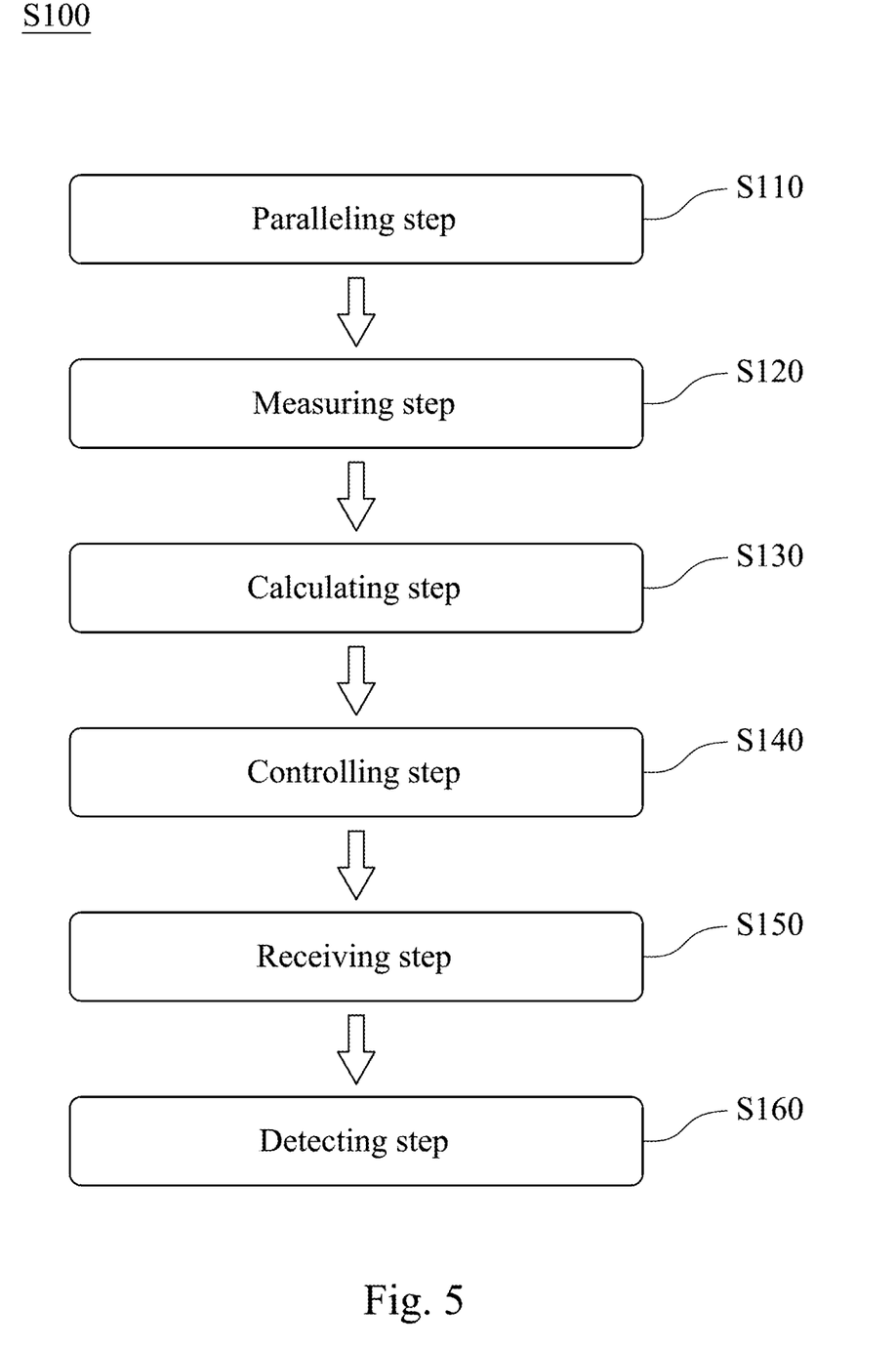
FIG. 5 shows a flow chart of a vehicle driving method according to an embodiment of a methodical aspect of the present disclosure.

FIG. 5 shows a flow chart of a vehicle driving method S100 according to an embodiment of a methodical aspect of the present disclosure. In FIG. 5, the vehicle driving method S100 includes a paralleling step S110, a measuring step S120, a calculating step S130 and a controlling step S140. The paralleling step S110 is performed to connect the first stator winding 121 and the second stator winding 122 in parallel to form the three-phase motor 120, wherein the first stator winding 121 and the second stator winding 122 are synchronized with each other. The first stator winding 121 includes the first-phase winding end U, the second-phase winding end V and the third-phase winding end W. The second stator winding 122 includes the first-phase winding end U', the second-phase winding end V' and the third-phase winding end W'. The measuring step S120 is performed to drive the first current sensor 131 to measure the first-phase current 1211 of the first stator winding 121 according to the first-phase winding end U of the first stator winding 121, wherein the first current sensor 131 is coupled to the first-phase winding end U of the first stator winding 121. The measuring step S120 is also performed to drive the second current sensor 132 to measure the second-phase current 1212 of the first stator winding 121 according to the second-phase winding end V of the first stator winding 121, wherein the second current sensor 132 is coupled to the second-phase winding end V of the first stator winding 121. The calculating step S130 is performed to calculate the first-phase current 1211 and the second-phase current 1212 of the first stator winding 121 according to the calculating procedure to generate the third-phase current of the first stator winding 121, wherein the calculating procedure is similar to the FOC theory which controls the three-phase motor 120 according to the feedback compensation of the first-phase current 1211 and the second-phase current 1212. Since the three-phase radian is $2\pi$ (that is, 360°), the third-phase current is calculated through the controlling unit 150. The FOC theory is the conventional art, and will not be detailedly described herein.

The controlling step S140 is performed to drive the first power module 141 and the second power module 142 to control the duty cycle between the first power module 141 and the second power module 142 according to the feedback compensation of the first-phase current 1211, the second-phase current 1212 and the third-phase current of the first stator winding 121. Therefore, the vehicle driving method S100 of the present disclosure uses the paralleling step S110, the measuring step S120, the calculating step S130 and the controlling step S140 to connect the stator windings (i.e., the first stator winding 121 and the second stator winding 122) of the three-phase motor 120 in parallel and calculate the feedback current according to the scale between the first stator winding 121 and the second stator winding 122. Due to the different positions of the stator windings in the winding slots of the three-phase motor 120, the induced currents are generated between the stator windings and the rotor of the three-phase motor 120. The vehicle driving method S100 of the present disclosure is favorable for reducing a fluctuation of the induced currents. After the total current of each of the phases and the phases are finally obtained, the duty cycle for turning on and off the first power module 141 and the second power module 142 is controlled according to the current phasor, the coordinate conversion and the feedback compensation so as to stably control the output power of the motor.

Furthermore, the vehicle driving method S100 can further include a receiving step S150 and a detecting step S160. The receiving step S150 is performed to drive the detecting module 160 to receive the first-phase voltage, the second-phase voltage and the third-phase voltage of the first stator winding 121. The receiving step S150 is also performed to drive the detecting module 160 to receive the first-phase voltage, the second-phase voltage and the third-phase voltage of the second stator winding 122. The detecting step S160 is performed to drive the detecting module 160 to detect the first-phase voltage, the second-phase voltage and the third-phase voltage of the first stator winding 121 corresponding to the first-phase voltage, the second-phase voltage and the third-phase voltage of the second stator winding 122 to generate the detecting signals. The detecting signals are the first-phase voltage signal 1611, the second-phase voltage signal 1621 and the third-phase voltage signal 1631, respectively.

Figure 6:
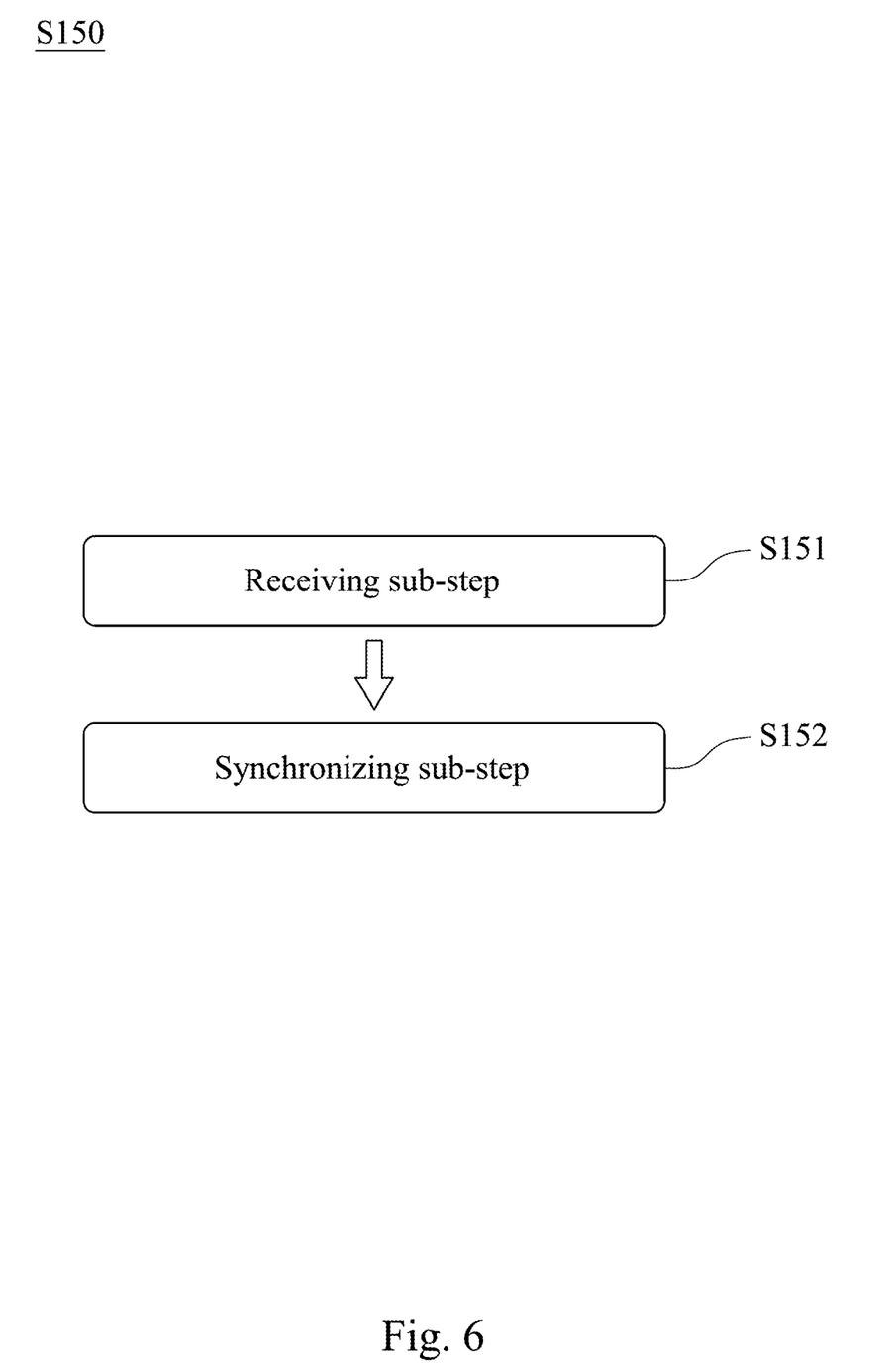
FIG. 6 shows a flow chart of a receiving step of the vehicle driving method of FIG. 5.

FIG. 6 shows a flow chart of the receiving step S150 of the vehicle driving method S100 of FIG. 5. In FIG. 6, the receiving step S150 can further include a receiving sub-step S151 and a synchronizing sub-step S152. The receiving sub-step S151 is performed to drive the controlling unit 150 to receive the detecting signals, wherein the controlling unit 150 includes the controller 151, the first switch S1 and the second switch S2, and the controller 151 generates the detecting result according to the detecting signals. The synchronizing sub-step S152 is performed to drive the controller 151 to synchronize the first power module 141 and the second power module 142 through the first switch S1 and the second switch S2, wherein the controller 151 independently detects the first power module 141 and the second power module 142.

Figure 7:
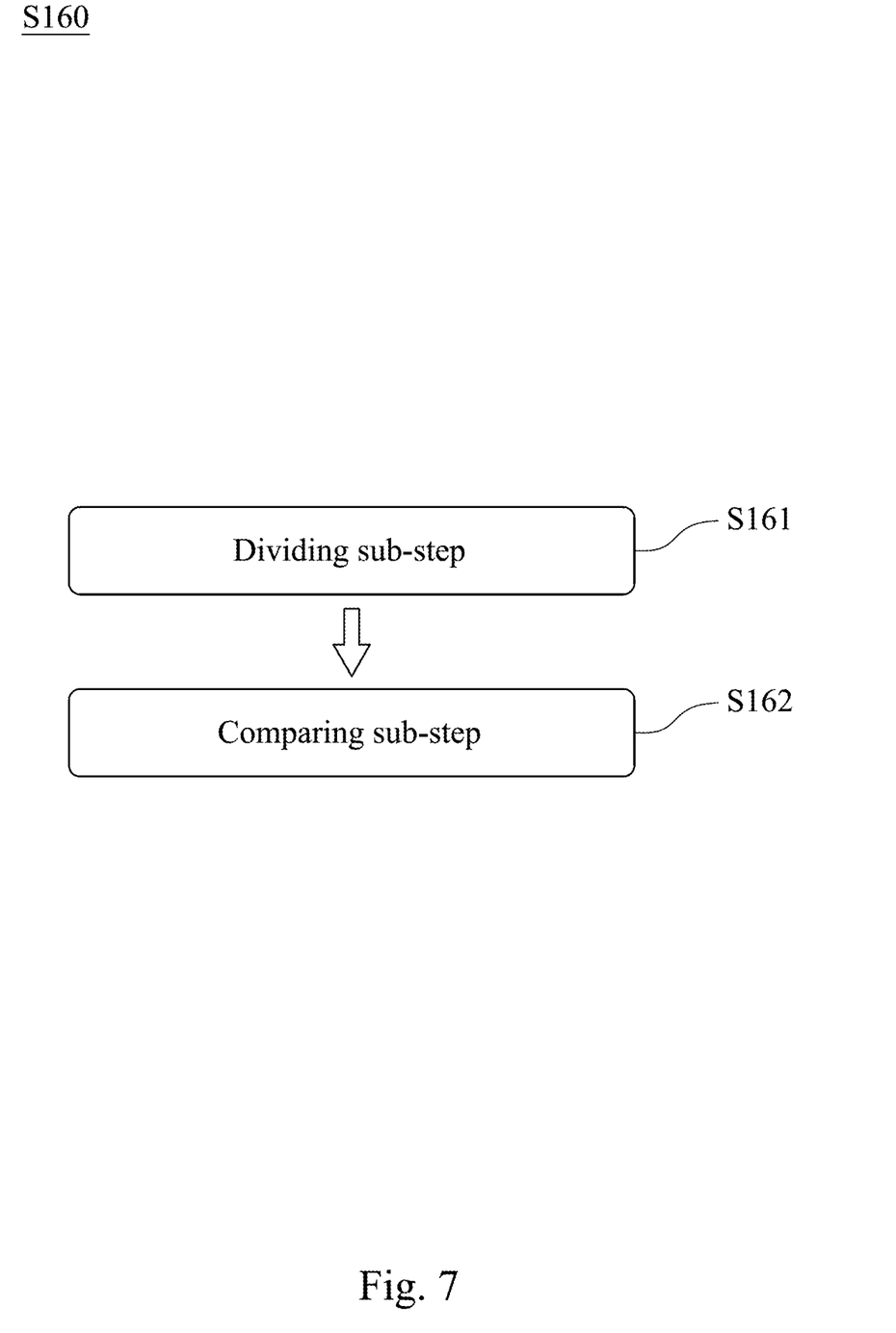
FIG. 7 shows a flow chart of a detecting step of the vehicle driving method of FIG. 5.

FIG. 7 shows a flow chart of the detecting step S160 of the vehicle driving method S100 of FIG. 5. In FIG. 7, the detecting step S160 can include a dividing sub-step S161 and a comparing sub-step S162. The dividing sub-step S161 is performed to drive a first resistor module to divide the first-phase voltage of the first stator winding 121 and the first-phase voltage of the second stator winding 122. The dividing sub-step S161 is also performed to drive a second resistor module to divide the second-phase voltage of the first stator winding 121 and the second-phase voltage of the second stator winding 122. The dividing sub-step S161 is also performed to drive a third resistor module to divide the third-phase voltage of the first stator winding 121 and the third-phase voltage of the second stator winding 122. The comparing sub-step S162 is performed to drive the first comparator 161 to generate the first-phase voltage signal 1611 according to the first-phase voltage of the first stator winding 121 and the first-phase voltage of the second stator winding 122. The comparing sub-step S162 is also performed to drive the second comparator 162 to generate the second-phase voltage signal 1621 according to the second-phase voltage of the first stator winding 121 and the second-phase voltage of the second stator winding 122. The comparing sub-step S162 is also performed to drive the third comparator 163 to generate the third-phase voltage signal 1631 according to the third-phase voltage of the first stator winding 121 and the third-phase voltage of the second stator winding 122.

In summary, the present disclosure has the following advantages: First, it is favorable for connecting the stator windings of the motor in parallel and calculating the feedback current used as the reference for the controlling current with the independent power modules according to the scale between the stator windings, so that the harmonics related to the phase currents can be reduced. Second, it is favorable for avoiding measuring the fluctuation of the feedback currents of other parallel windings so as to improve the output power and the efficiency of the motor. Third, it is favorable for reducing the use of the current sensors, so that the manufacturing cost of the vehicle driving device can be reduced.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A vehicle driving device, which is driven by a power supply unit, comprising:
    a three-phase motor comprising a first stator winding and a second stator winding, wherein the first stator winding is connected in parallel to the second stator winding, the first stator winding and the second stator winding are synchronized with each other, and each of the first stator winding and the second stator winding comprises a first-phase winding end, a second-phase winding end and a third-phase winding end;
    a first current sensor having a first end and a second end, wherein the first end of the first current sensor is coupled to the first-phase winding end of the first stator winding, and the first current sensor is configured to measure a first-phase current of the first stator winding;
    a second current sensor having a first end and a second end, wherein the first end of the second current sensor is coupled to the second-phase winding end of the first stator winding, and the second current sensor is configured to measure a second-phase current of the first stator winding;
    a first power module electrically connected to the power supply unit, the second end of the first current sensor, the second end of the second current sensor and the third-phase winding end of the first stator winding;
    a second power module connected in parallel to the first power module and electrically connected to the power supply unit, and the first-phase winding end, the second-phase winding end and the third-phase winding end of the second stator winding;
    a detecting module coupled to the first stator winding and the second stator winding and outputting a plurality of detecting signals according to the first stator winding and the second stator winding, wherein the detecting signals are a first-phase voltage signal, a second-phase voltage signal and a third-phase voltage signal, respectively; and
    a controlling unit electrically connected to the power supply unit and comprising:
        a controller receiving the detecting signals and generating a detecting result according to the detecting signals;
        a first switch coupled to the first power module; and
        a second switch coupled to the second power module;
    wherein the detecting module comprises:
        a first comparator electrically connected to the first-phase winding end of the first stator winding and the first-phase winding end of the second stator winding;
        a second comparator electrically connected to the second-phase winding end of the first stator winding and the second-phase winding end of the second stator winding; and
        a third comparator electrically connected to the third-phase winding end of the first stator winding and the third-phase winding end of the second stator winding;
    wherein the controller synchronizes the first power module and the second power module through the first switch and the second switch, and independently detects the first power module and the second power module;
    wherein a third-phase current of the first stator winding is generated according to a calculating procedure of the first-phase current and the second-phase current of the first stator winding;
    wherein a duty cycle between the first power module and the second power module is controlled by detecting two of the first-phase current, the second-phase current and the third-phase current of the first stator winding and performing a feedback compensation according to a scale.

2. The vehicle driving device of claim 1, wherein,
    the first comparator generates the first-phase voltage signal according to the first-phase winding end of the first stator winding and the first-phase winding end of the second stator winding;

the second comparator generates the second-phase voltage signal according to the second-phase winding end of the first stator winding and the second-phase winding end of the second stator winding; and the third comparator generates the third-phase voltage signal according to the third-phase winding end of the first stator winding and the third-phase winding end of the second stator winding.

3. The vehicle driving device of claim 1, wherein the first power module comprises:

two first power elements connected in series to form a first bridge arm, wherein the first bridge arm is electrically connected to the second end of the first current sensor;

two second power elements connected in series to form a second bridge arm, wherein the second bridge arm is electrically connected to the second end of the second current sensor; and two third power elements connected in series to form a third bridge arm, wherein the third bridge arm is electrically connected to the third-phase winding end of the first stator winding.

4. The vehicle driving device of claim 1, wherein the second power module comprises:

two first power elements connected in series to form a first bridge arm, wherein the first bridge arm is electrically connected to the first-phase winding end of the second stator winding;

two second power elements connected in series to form a second bridge arm, wherein the second bridge arm is electrically connected to the second-phase winding end of the second stator winding; and two third power elements connected in series to form a third bridge arm, wherein the third bridge arm is electrically connected to the third-phase winding end of the second stator winding.

5. A vehicle driving method, comprising:

a paralleling step performed to connect a first stator winding and a second stator winding in parallel to form a three-phase motor, wherein the first stator winding and the second stator winding are synchronized with each other, and each of the first stator winding and the second stator winding comprises a first-phase winding end, a second-phase winding end and a third-phase winding end;

a measuring step performed to drive a first current sensor to measure a first-phase current of the first stator winding according to the first-phase winding end of the first stator winding, and drive a second current sensor to measure a second-phase current of the first stator winding according to the second-phase winding end of the first stator winding, wherein the first current sensor is coupled to the first-phase winding end of the first stator winding, and the second current sensor is coupled to the second-phase winding end of the first stator winding;

a calculating step performed to calculate the first-phase current and the second-phase current of the first stator winding according to a calculating procedure to generate a third-phase current of the first stator winding;

a controlling step performed to control a duty cycle between the first power module and the second power module by detecting two of the first-phase current, the second-phase current and the third-phase current of the first stator winding and performing a feedback compensation according to a scale;

a receiving step, comprising:

driving a detecting module to receive a first-phase voltage, a second-phase voltage and a third-phase voltage of the first stator winding; and driving the detecting module to receive a first-phase voltage, a second-phase voltage and a third-phase voltage of the second stator winding; and a detecting step performed to drive the detecting module to detect the first-phase voltage, the second-phase voltage and the third-phase voltage of the first stator winding corresponding to the first-phase voltage, the second-phase voltage and the third-phase voltage of the second stator winding to generate a plurality of detecting signals;

wherein the detecting signals are a first-phase voltage signal, a second-phase voltage signal and a third-phase voltage signal, respectively;

wherein the receiving step further comprises:

a receiving sub-step performed to drive a controlling unit to receive the detecting signals, wherein the controlling unit comprises a controller, a first switch and a second switch, and the controller generates a detecting result according to the detecting signals; and a synchronizing sub-step performed to drive the controller to synchronize the first power module and the second power module through the first switch and the second switch, wherein the controller independently detects the first power module and the second power module;

wherein the detecting step comprises:

a dividing sub-step, comprising:

driving a first resistor module to divide the first-phase voltage of the first stator winding and the first-phase voltage of the second stator winding;

driving a second resistor module to divide the second-phase voltage of the first stator winding and the second-phase voltage of the second stator winding; and driving a third resistor module to divide the third-phase voltage of the first stator winding and the third-phase voltage of the second stator winding; and a comparing sub-step, comprising:

driving a first comparator to generate the first-phase voltage signal according to the first-phase voltage of the first stator winding and the first-phase voltage of the second stator winding;

driving a second comparator to generate the second-phase voltage signal according to the second-phase voltage of the first stator winding and the second-phase voltage of the second stator winding; and driving a third comparator to generate the third-phase voltage signal according to the third-phase voltage of the first stator winding and the third-phase voltage of the second stator winding.

* * * * *